(12) United States Patent
Cook

(10) Patent No.: US 7,382,498 B1
(45) Date of Patent: Jun. 3, 2008

(54) TWO-CHANNEL IMAGING SPECTROMETER UTILIZING SHARED OBJECTIVE, COLLIMATING, AND IMAGING OPTICS

(75) Inventor: Lacy G. Cook, El Segundo, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 11/796,895

(22) Filed: Apr. 30, 2007

(51) Int. Cl.
*G01J 3/28* (2006.01)
(52) U.S. Cl. .................. 358/328; 356/326; 356/334
(58) Field of Classification Search ............... 356/328, 356/326, 334; 359/369, 365, 729, 366, 859, 359/861
See application file for complete search history.

(56) References Cited

U.S. PATENT DOCUMENTS

| | | | |
|---|---|---|---|
| 4,101,195 A | 7/1978 | Korsch | |
| 4,265,510 A | 5/1981 | Cook | |
| 4,733,955 A | 3/1988 | Cook | |
| 5,260,767 A | 11/1993 | Cook | |
| 5,394,237 A * | 2/1995 | Chang et al. | ............... 356/328 |
| 5,550,672 A | 8/1996 | Cook | |
| 6,122,051 A | 9/2000 | Ansley et al. | |
| 6,886,953 B2 | 5/2005 | Cook | |
| 7,080,912 B2 | 7/2006 | Cook | |

* cited by examiner

*Primary Examiner*—F. L. Evans
*Assistant Examiner*—Abdullahi Nur
(74) *Attorney, Agent, or Firm*—Leonard A. Alkov

(57) ABSTRACT

A two-channel spectrometer has a shared objective and a pair of slits at a common image plane. Each of the slits receives a portion of the output beam of the shared objective and is optimized for transmitting different wavelengths. A shared double-pass reflective triplet receives the output beams of the slits. The output of the reflective triplet is incident upon a beamsplitter, which sends a collimated first reflective triplet output of a first wavelength to a first dispersive element, and a collimated second reflective triplet output of a second wavelength to a second dispersive element. The outputs of the dispersive elements are directed back to the beamsplitter and the reflective triplet to imaging detectors located at two different locations of the common image plane.

22 Claims, 3 Drawing Sheets

TWO-CHANNEL IMAGING SPECTROMETER UTILIZING SHARED OBJECTIVE, COLLIMATING, AND IMAGING OPTICS

This invention relates to an optical imaging spectrometer and, more particularly, to an optical spectrometer that provides hyperspectral imaging of a scene in two significantly different wavelength bands.

BACKGROUND OF THE INVENTION

Imaging spectrometers that form high-resolution images in a wide range of spectral bands are used in scientific, military, and resource-sensing applications. Such spectrometers provide an image and also a spectral analysis of the image in a selected wavelength band. However, the existing designs have limitations on the wavelengths that may be analyzed. In developing the present invention, the inventor has observed that in some applications it would be useful to simultaneously assess the image in two spectral bands that are disjoint and well separated. For example, the reflective/emissive spectral band of 0.5-5 micrometers wavelength yields visible and mid-infrared information, and the long wavelength infrared band of 7.5-12.5 micrometers yields thermal information. These two types of information, taken together and possibly with a broad band visible-light image, allow analysis of the features of the scene not possible with existing imaging spectrometers.

The existing designs of imaging spectrometers do not permit hyperspectral imaging in two different disjoint, well-separated spectral bands such as those discussed. There is a need for such a capability. The present invention fulfills this need, and further provides related advantages.

SUMMARY OF THE INVENTION

This invention provides a two-channel spectrometer that permits hyperspectral imaging in two different, disjoint, well-separated spectral bands. The objective and collimating-and-imaging functions are performed by reflective-only optics, so that the performance of the system is not degraded by the wavelength dependence of refractive optics. The spectrometer uses a shared objective and a shared collimating-and-imaging structure, so that these heaviest, bulkiest portions of the spectrometer are not duplicated. The wavelength-dependent functionalities of the structure, including the imaging detectors and dispersive elements, are separately provided but integrated with the shared objective and the shared collimating-and-imaging structure. This arrangement accomplishes the two-channel hyperspectral imaging, while minimizing weight and size of the instrument.

In accordance with the invention, a two-channel spectrometer comprises a first slit that receives a first portion of an incident beam and transmits a first slit output beam of a first wavelength of light. The first slit is preferably optimized for spectrometry of the first wavelength. A second slit receives a second portion of the incident beam and transmits a second slit output beam of a second wavelength of light. The second slit is preferably optimized for spectrometry of the second wavelength. The first slit and the second slit are located at a common image plane. A shared double-pass all-reflective optical form receives the first slit output beam and the second slit output beam, and has a reflective optical form output comprising a collimated output of the first wavelength and a collimated output of the second wavelength. A first dispersive element receives the collimated output of the first wavelength and produces a first dispersed output. The first dispersive element is oriented to direct the first dispersed output through the shared double-pass all-reflective optical form to be incident upon a first location of the common image plane. A second dispersive element receives the collimated output of the second wavelength and produces a second dispersed output. The second dispersive element is oriented to direct the second dispersed output through the shared double-pass all-reflective optical form to be incident upon a second location of the common image plane. There is a first imaging detector at the first location, and a second imaging detector at the second location.

Preferably, the spectrometer further includes a shared objective having an input and as an output the incident beam. Most preferably, the objective is an all-reflective objective that uses only mirrors and no lenses.

Optionally, a panchromatic imaging detector is provided on the input side (i.e., the shared objective side) of the common image plane.

To direct the all-reflective optical form output, the spectrometer preferably further includes a beamsplitter upon which the all-reflective optical form output is incident. The beamsplitter separates the collimated output of the first wavelength from the collimated output of the second wavelength, and diverts the first wavelength to the first dispersive element and the second wavelength to the second dispersive element.

The shared double-pass all-reflective optical form is preferably a three-mirror optical form. Most preferably, the shared double-pass all-reflective optical form is a reflective triplet with a primary mirror having a positive optical power, a secondary mirror having a negative optical power, and a tertiary mirror having a positive optical power.

The non-shared optical elements are preferably optimized for the respective spectral bands of interest. For example, in one embodiment the width of the first slit is optimized for the 0.5-5 micrometer wavelength range and has a width of from about 20 micrometers to about 30 micrometers. The width of the second slit is optimized for the 7.5-12.5 micrometer wavelength range and has a width of from about 60 micrometers to about 100 micrometers. (These slit-width choices are dependent upon the pixel size of the imaging detector and the F-number of the objective optics.) In another optimization, the first dispersive element and the second dispersive element may be of different constructions. In the preferred set of wavelength ranges, the first dispersive element is a prism that is optimal for the 0.5-5.0 micrometer wavelength range, and the second dispersive element is a diffraction grating that is optimal for the 7.5-12.5 micrometer wavelength range. However, in other cases the same type of construction may be used for the two dispersive components. The first imaging detector is a focal plane array optimized for the first wavelength range, and the second imaging detector is a focal plane array optimized for the second wavelength range. For other wavelength ranges, other optimal selections of the non-shared elements may be made.

In a preferred embodiment, a two-channel spectrometer comprises a shared objective having an input and an output beam. A first slit receives a first portion of the output beam of the shared objective and transmits a first slit output beam of a first wavelength of light. The first slit is preferably optimized for spectrometry of the first wavelength. A second slit receives a second portion of the output beam of the shared objective and transmits a second slit output beam of a second wavelength of light. The second slit is preferably optimized for spectrometry of the second wavelength. The first slit and the second slit are located at a common image plane. A shared double-pass all-reflective triplet receives the first slit output beam and the second slit output beam, and has a collimated reflective triplet output comprising a collimated first reflective triplet output of the first wavelength and a collimated second reflective triplet output of the second wavelength. The reflective triplet output is incident upon a beamsplitter, preferably a dichroic beamsplitter. The beamsplitter separates the collimated first reflective triplet output of the first wavelength from the collimated second reflective triplet output of the second wavelength. A first dispersive element receives from the beamsplitter the collimated first reflective triplet output of the first wavelength and produces a first dispersed output. The first dispersive element is oriented to direct the first dispersed output through the shared double-pass reflective triplet to be incident upon a first location of the common image plane. A second dispersive element receives from the beamsplitter the collimated second reflective triplet output of the second wavelength and produces a second dispersed output. The second dispersive element is oriented to direct the second dispersed output through the shared double-pass reflective triplet to be incident upon a second location of the common image plane. There is a first imaging detector at the first location, and a second imaging detector at the second location. Other compatible features discussed herein may be used with this embodiment.

The present approach uses shared optical components where possible. The shared optical components are selected to be compatible with the two different wavelength ranges, and are therefore preferably all-reflective in construction. The non-shared optical components are respectively selected and optimized for the different wavelength ranges, while being compatible with the shared optical components. This design architecture minimizes the size, weight, and cost of the two-channel spectrometer, an important consideration for many applications.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

FIGS. 1-4 depict a preferred embodiment of a two-channel spectrometer 20. The two-channel spectrometer 20 includes a shared objective 22 having an input 24 from a scene being viewed, and an output beam 26. As used herein, "shared" means that the single element or optical module is utilized by both of the two channels or wavelength ranges. That is, there is a single objective 22 used by light of both wavelength ranges, and not a separate objective for each wavelength range. The shared objective 22 may be of any operable form, but it is strongly preferred that the shared objective 22 be an all-reflective objective, made solely of mirrors and with no lenses. The index of refraction of a lens is dependent upon the wavelength of the light being refracted, and the effect on performance in the present circumstances would be unacceptable in most cases. Thus, the objective 22 is preferably made only of mirrors.

Figure 1:
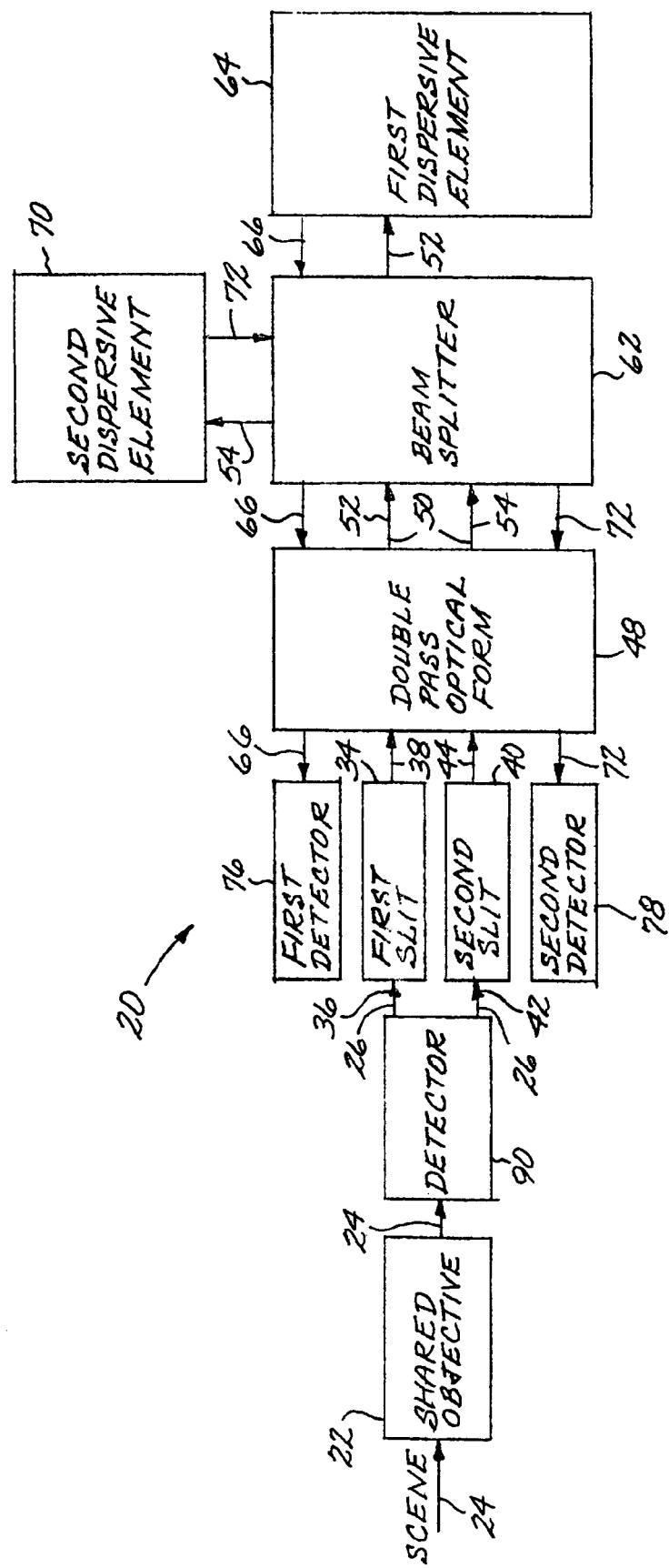
FIG. 1 is a block diagram of a preferred embodiment of the two-channel spectrometer.
Figure 2:
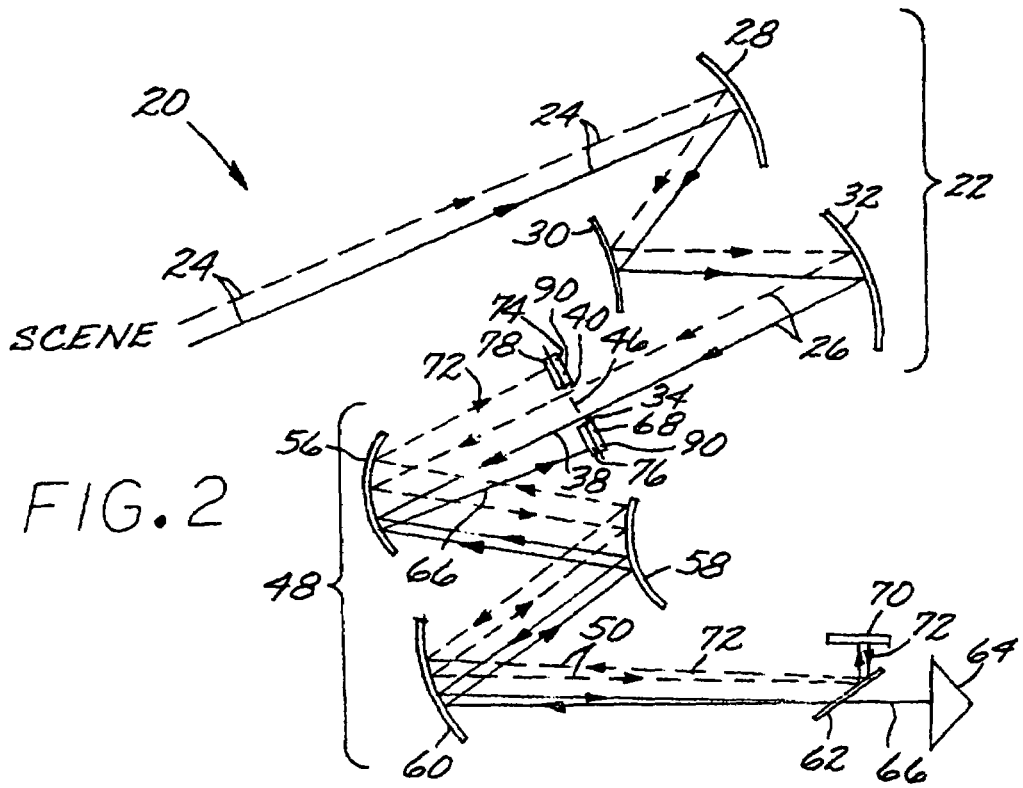
FIG. 2 is a schematic optical-path layout of the embodiment of the two-channel spectrometer illustrated in FIG. 1.
Figure 3:
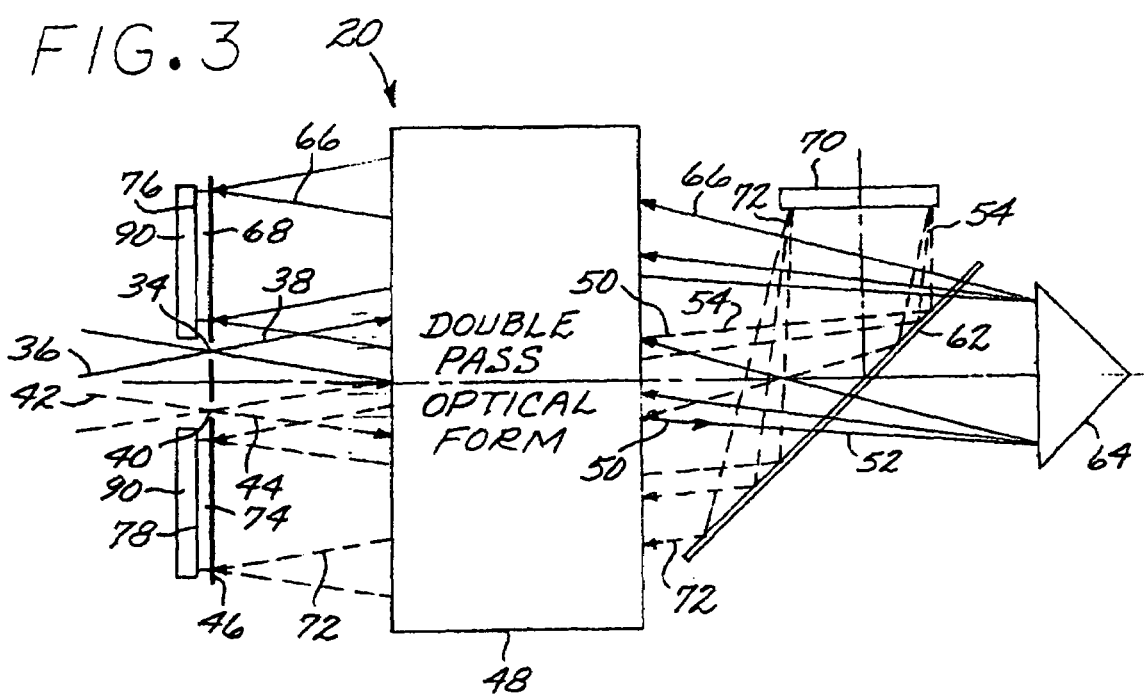
FIG. 3 is a combination block and ray-path schematic drawing of a portion of the embodiment of FIG. 1, from which the shared objective has been omitted.
Figure 4:
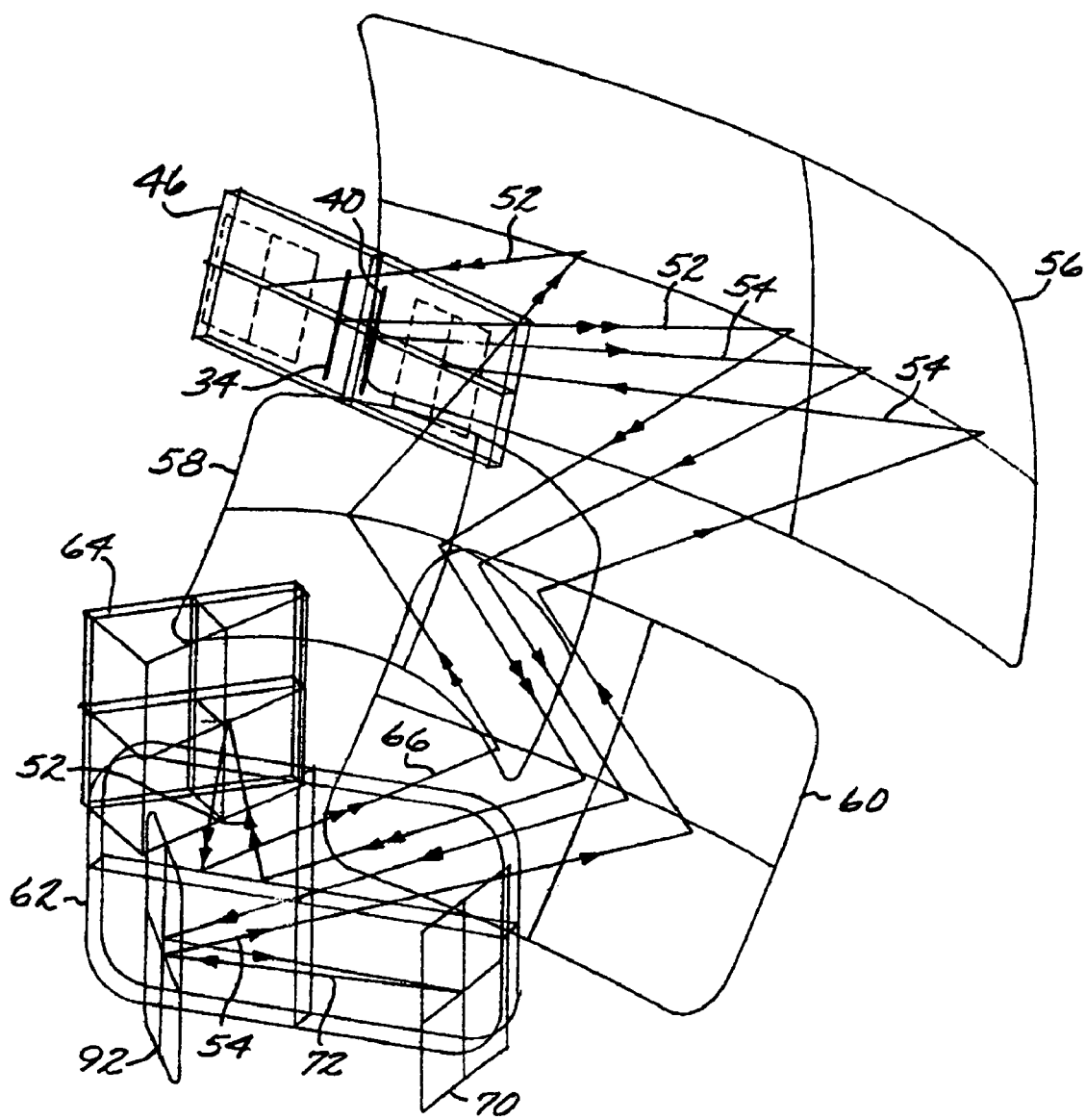
FIG. 4 is a ray-trace schematic perspective view of the preferred embodiment of the two-channel spectrometer, from which the shared objective has been omitted and with structural variations to illustrate operable approaches.

FIG. 2 illustrates a preferred form of the shared all-reflective objective 22, although other forms of all-reflective objectives are equally acceptable. The shared objective 22 of FIG. 2 includes a set of three mirrors including an objective primary mirror 28 of positive optical power, an objective secondary mirror 30 of negative optical power, and an objective tertiary mirror 32 of positive optical power.

As seen in FIGS. 1-4, a first slit 34 receives a first portion 36 of the output beam 26 of the shared objective 22. That is, the first portion 36 of the output beam 26 forms a first input to the first slit 34. The first slit 34 transmits a first slit output beam 38 of a first wavelength of light. The width of the first slit 34 is optimized for spectrometry of the first wavelength. As used herein, a "wavelength" or "channel" means either a single discrete wavelength or, more usually, a wavelength range. In the presently preferred embodiment, the first wavelength is a wavelength range of 0.5-5.0 micrometers. The optimization of the first slit 34 is a selection of the width of the first slit 34 to be optimal for such a first wavelength. In this case, for the wavelength range of 0.5-5.0 micrometers, the first slit 34 has a width of from 20 micrometers to 30 micrometers.

Similarly, a second slit 40 receives a second portion 42 of the output beam 26 of the shared objective 22. That is, the second portion 42 of the output beam 26 forms a second input to the second slit 40. The second slit 40 transmits a second slit output beam 44 of a second wavelength of light. The width of the second slit 40 is optimized for spectrometry of the second wavelength. In the presently preferred embodiment, the second wavelength is a wavelength range of 7.5-12.5 micrometers. The optimization of the second slit 38 is a selection of the width of the second slit 38 to be optimal for such a second wavelength. In this case, for the wavelength range of 7.5-12.5 micrometers, the second slit 38 has a width of from 60 micrometers to 100 micrometers.

The first slit 34 and the second slit 40 are located at a plane, termed a common image plane 46. The common image plane 46 is defined for subsequent reference. No dispersed image is formed at the slits 34 and 40, but dispersed images are formed at the common image plane 46 at locations lateral to the slits 34 and 40 by a mechanism to be discussed later.

Optionally but preferably, a panchromatic imaging detector 90 is provided on the input side (i.e., the shared objective side) of the common image plane 46. The panchromatic imaging detector 90 is preferably a focal plane array that forms an image of the scene from the input 24 after the input 24 passes through the shared objective 22 and is incident upon a portion of common image plane 46 that faces toward the shared objective 22 and is not within the slits 34 and 40, because it has a field offset and is in a different portion of the field of view of the optics.

A shared double-pass reflective optical form 48, in this case a shared double-pass reflective triplet 48, receives the first slit output beam 38 and the second slit output beam 44. The double-pass reflective triplet 48 serves as the shared collimating optical form for the spectrometer 20. The double-pass reflective triplet 48 has a collimated reflective triplet output 50 comprising a collimated first reflective triplet output 52 of the first wavelength and a collimated second reflective triplet output 54 of the second wavelength.

The shared double-pass optical system is preferably a reflective triplet 48. In the embodiment illustrated in FIG. 2, the reflective triplet 48 has a primary mirror 56 having a positive optical power, a secondary mirror 58 having a negative optical power, and a tertiary mirror 60 having a positive optical power.

The collimated reflective triplet output 50 is incident upon a beamsplitter 62, which is preferably a dichroic beamsplitter. The beamsplitter 62 separates the collimated first reflective triplet output 52 of the first wavelength from the collimated second reflective triplet output 54 of the second wavelength. In the form of the beamsplitter 62 illustrated in FIGS. 1-4, the collimated first reflective triplet output 52 of the first wavelength is transmitted through the beamsplitter 62, and the collimated second reflective triplet output 54 of the second wavelength is reflected at a significant angle, preferably at about a 90 degree angle by the beamsplitter 62. In another variant, the collimated first reflective triplet output 52 of the first wavelength is reflected by the beamsplitter 62 at a significant angle, preferably at about a 90 degree angle, and the collimated second reflective triplet output 54 of the second wavelength is transmitted straight through the beamsplitter 62. Either type of beamsplitter is acceptable.

A first dispersive element 64 receives from the beamsplitter 62 the collimated first reflective triplet output 52 of the first wavelength and produces a first dispersed output 66. The angular direction of the first dispersed output 66 of the dispersed light is determined by the spatial orientation of the first dispersive element 64. The first dispersive element 64 is oriented to direct the first dispersed output 66 back through the beamsplitter 62, and then through the shared double-pass reflective triplet 48 to be incident upon a first location 68 of the common image plane 46.

A second dispersive element 70 receives from the beamsplitter 62 the collimated second reflective triplet output 54 of the second wavelength and produces a second dispersed output 72. The angular direction of the second dispersed output 72 of the dispersed light is determined by the spatial orientation of the second dispersive element 70. The second dispersive element 70 is oriented to direct the second dispersed output 72 back through the beamsplitter 62, and then through the shared double-pass reflective triplet 48 to be incident upon a second location 74 of the common image plane 46. (In the embodiment shown in FIG. 4, a fold mirror 92 aids in directing the collimated second reflective triplet output 54 and the second dispersed output 72.) For this reason, the shared reflective triplet 48 is termed a "double-pass" optical component, because the light beams travel through the shared reflective triplet 48, and are collimated on the way to the dispersive elements 64 and 70. Then on the way back from the dispersive elements 64 and 70, the light travels through the shared reflective triplet 48 and is imaged on the common image plane 46.

The first dispersive element 64 may be of the same type as the second dispersive element 70, or of a different type. For example, the dispersive elements 64 and 70 may both be prisms or may both be diffraction gratings. On the other hand, one of the dispersive elements 64 and 70 may be a prism, and the other a diffraction grating. In the case of the prism, the rear surface of the prism may be coated to reflect the incident light, or a separate flat mirror may be located immediately next to the back side of the prism. In the presently preferred embodiment of a spectrometer optimized for a first wavelength of 0.5-5 micrometers and a second wavelength of 7.5-12.5 micrometers, the first dispersive element 64 is selected to be a prism, and the second dispersive element 70 is selected to be a diffraction grating. The prism may be, for example, a single-material prism, a two-material prism, a three-material prism, and so on. The use of a multiple-material prism reduces the dispersion variability over the wavelength range and produces a more nearly constant dispersion.

The first location 68 of the common image plane 46 and the second location 74 of the common image plane 46 are positioned lateral to the first slit 34 and the second slit 40, and preferably outboard and on either side of the first slit 34 and the second slit 40. A first imaging detector 76 is positioned at the first location 68 facing toward the double-pass reflective triplet 48. A second imaging detector 78 is positioned at the second location. The imaging detectors 76 and 78 are both preferably focal plane arrays. The focal plane arrays may be identical or of different construction, but are typically of different construction. They are typically of different construction because the first imaging detector 76 is optimized for the first wavelength, in the preferred embodiment 0.5-5 micrometers, and the second imaging detector 78 is optimized for the second wavelength, in the preferred embodiment 7.5-12.5 micrometers. Focal plane arrays optimized for various wavelengths are known in the art for other applications.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A two-channel spectrometer comprising:
    a first slit that receives a first portion of an incident beam and transmits a first slit output beam of a first wavelength of light;
    a second slit that receives a second portion of the incident beam and transmits a second slit output beam of a second wavelength of light, and wherein the first slit and the second slit are located at a common image plane;
    a shared double-pass all-reflective optical form that receives the first slit output beam and the second slit output beam, and has a reflective optical form output comprising a collimated output of the first wavelength and a collimated output of the second wavelength;
    a first dispersive element that receives the collimated output of the first wavelength and produces a first dispersed output, wherein the first dispersive element is oriented to direct the first dispersed output through the shared double-pass reflective optical form to be incident upon a first location of the common image plane;
    a second dispersive element that receives the collimated output of the second wavelength and produces a second dispersed output, wherein the second dispersive element is oriented to direct the second dispersed output through the shared double-pass reflective optical form to be incident upon a second location of the common image plane;
    a first imaging detector at the first location of the common image plane; and
    a second imaging detector at the second location of the common image plane.

2. The spectrometer of claim 1, wherein the spectrometer further includes
a shared objective having an input and as an output the incident beam.

3. The spectrometer of claim 1, wherein the spectrometer further includes
a shared all-reflective objective having an input and as an output the incident beam.

4. The spectrometer of claim 1, wherein the spectrometer further includes
a beamsplitter upon which the reflective optical form output is incident, wherein the beamsplitter separates the collimated output of the first wavelength from the collimated output of the second wavelength.

5. The spectrometer of claim 1, wherein the first slit is optimized for spectrometry of the first wavelength, and wherein the second slit is optimized for spectrometry of the second wavelength.

6. The spectrometer of claim 1, wherein
the first slit has a width of from about 20 micrometers to about 30 micrometers, and
the second slit has a width of from about 60 micrometers to about 100 micrometers.

7. The spectrometer of claim 1, wherein the first imaging detector is sensitive to the 0.5-5.0 micrometer wavelength band, and the second imaging detector is sensitive to the 7.5-12.5 micrometer wavelength band.

8. The spectrometer of claim 1, wherein the shared double-pass reflective optical form is a three-mirror optical form.

9. The spectrometer of claim 1, wherein the shared double-pass all-reflective optical form is a reflective triplet having
a primary mirror having a positive optical power,
a secondary mirror having a negative optical power, and
a tertiary mirror having a positive optical power.

10. The spectrometer of claim 1, wherein
the first dispersive element and the second dispersive element are of different constructions.

11. The spectrometer of claim 1, wherein
the first dispersive element is a prism, and
the second dispersive element is a diffraction grating.

12. The spectrometer of claim 1, wherein
the first imaging detector is a focal plane array optimized for the first wavelength, and
the second imaging detector is a focal plane array optimized for the second wavelength.

13. A two-channel spectrometer comprising:
a shared objective having an input and an output beam;
a first slit that receives a first portion of the output beam of the shared objective and transmits a first slit output beam of a first wavelength of light;
a second slit that receives a second portion of the output beam of the shared objective and transmits a second slit output beam of a second wavelength of light, and wherein the first slit and the second slit are located at a common image plane;
a shared double-pass reflective triplet that receives the first slit output beam and the second slit output beam, and has a reflective triplet output comprising a collimated first reflective triplet output of the first wavelength and a collimated second reflective triplet output of the second wavelength;
a beamsplitter upon which the reflective triplet output is incident, wherein the beamsplitter separates the collimated first reflective triplet output of the first wavelength from the collimated second reflective triplet output of the second wavelength;
a first dispersive element that receives from the beamsplitter the collimated first reflective triplet output of the first wavelength and produces a first dispersed output, wherein the first dispersive element is oriented to direct the first dispersed output through the shared double-pass reflective triplet to be incident upon a first location of the common image plane;
a second dispersive element that receives from the beamsplitter the collimated second reflective triplet output of the second wavelength and produces a second dispersed output, wherein the second dispersive element is oriented to direct the second dispersed output through the shared double-pass reflective triplet to be incident upon a second location of the common image plane;
a first imaging detector at the first location of the common image plane; and
a second imaging detector at the second location of the common image plane.

14. The spectrometer of claim 13, wherein
the shared objective is an all-reflective objective.

15. The spectrometer of claim 13, wherein the first imaging detector is sensitive to the 0.5-5.0 micrometer wavelength band, and the second imaging detector is sensitive to the 7.5-12.5 micrometer wavelength band.

16. The spectrometer of claim 13, wherein the first slit is optimized for spectrometry of the first wavelength, and wherein the second slit is optimized for spectrometry of the second wavelength.

17. The spectrometer of claim 13, wherein
the first slit has a width of from about 20 micrometers to about 30 micrometers, and
the second slit has a width of from about 60 micrometers to about 100 micrometers.

18. The spectrometer of claim 13, wherein the shared double-pass reflective triplet comprises
a primary mirror having a positive optical power,
a secondary mirror having a negative optical power, and
a tertiary mirror having a positive optical power.

19. The spectrometer of claim 13, wherein the beamsplitter is a dichroic beamsplitter upon which the reflective triplet output is incident, wherein the dichroic beamsplitter transmits the collimated first reflective triplet output of the first wavelength and reflects the collimated second reflective triplet output of the second wavelength.

20. The spectrometer of claim 13, wherein
the first dispersive element and the second dispersive element are of different constructions.

21. The spectrometer of claim 13, wherein
the first dispersive element is a prism, and
the second dispersive element is a diffraction grating.

22. The spectrometer of claim 13, wherein
the first imaging detector is a focal plane array optimized for the first wavelength, and
the second imaging detector is a focal plane array optimized for the second wavelength.

* * * * *